(12) United States Patent
Kavia et al.

(10) Patent No.: US 12,238,147 B2
(45) Date of Patent: Feb. 25, 2025

(54) FORWARDING SESSION INITIATION MESSAGES

(71) Applicant: Microsoft Technology Licensing, LLC, Redmond, WA (US)

(72) Inventors: Anish Kavia, Slough (GB); Salem Amin Al-Damluji, Chorleywood (GB); Janaka Ranabahu, London (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 78 days.

(21) Appl. No.: 18/061,933

(22) Filed: Dec. 5, 2022

(65) Prior Publication Data
US 2024/0187462 A1  Jun. 6, 2024

(51) Int. Cl.
*H04L 65/1094* (2022.01)
*H04L 65/1069* (2022.01)
*H04L 65/1104* (2022.01)

(52) U.S. Cl.
CPC ...... *H04L 65/1094* (2022.05); *H04L 65/1069* (2013.01); *H04L 65/1104* (2022.05)

(58) Field of Classification Search
None
See application file for complete search history.

(56) References Cited

U.S. PATENT DOCUMENTS

| | | | | |
|---|---|---|---|---|
| 2006/0291639 | A1* | 12/2006 | Radziewicz | H04M 3/42017 379/211.01 |
| 2012/0042083 | A1* | 2/2012 | Ghazanfar | H04L 51/56 709/227 |
| 2022/0094548 | A1 | 3/2022 | Asveren | |
| 2024/0163323 | A1* | 5/2024 | Yang | G06Q 30/0251 |

OTHER PUBLICATIONS

International Search Report and Written Opinion received for PCT Application No. PCT/US23/035562, mailed on Dec. 13, 2023, 12 pages.
Handley, et al., "SDP: Session Description Protocol", Retrieved from: https://www.rfc-editor.org/rfc/pdfrfc/rfc4566.txt.pdf, Jul. 2006, 49 Pages.
Itu: "Series V: Data Communication Over the Telephone Network", International Telecommunication Union, V.18, Retrieved from: https://www.itu.int/rec/T-REC-V.18-200011-I/en, Nov. 2000, 64 Pages.

* cited by examiner

*Primary Examiner* — Quang N Nguyen
(74) *Attorney, Agent, or Firm* — ArentFox Schiff LLP

(57) ABSTRACT

A second device (e.g., a session border controller (SBC) receives, from a first device (e.g., a video teleconference server) of an IP communication network, an invitation (e.g., a session initiation protocol (SIP) message) to create a session between the first device and a third device (e.g., a computer of a person participating in the teleconference) of the network. The invitation includes a session description, e.g., in session description protocol (SDP) format. The second device determines whether to forward the invitation toward the third device based on a datastore comprising i) prior invitations received by the second device to create sessions between devices of the network, and ii) results of the prior invitations. Upon determining to forward the invitation, the second device forwards the invitation.

30 Claims, 11 Drawing Sheets

FORWARDING SESSION INITIATION MESSAGES

BACKGROUND

Voice over Internet Protocol (VOIP) describes a set of technologies for the delivery of voice communications and multimedia sessions over IP networks, such as the Internet. VoIP sessions can proceed similar to traditional telephony from the user viewpoint, but instead of being transmitted over a circuit-switched network, a digital form of the information is packetized, and transmission occurs as IP packets over a packet-switched network.

A Session Border Controller (SBC) is a network function that secures voice over IP (VOIP) infrastructures while providing interworking between incompatible signaling messages and media flows (sessions) from end devices or application servers. SBCs can be employed in enterprise infrastructures or any carrier network delivering commercial residential, business, fixed-line or mobile VOIP services. SBCs are typically deployed at both the network edge and at carrier interconnects, the demarcation points (borders) between their users and other service providers. While historically supporting the various signaling types employed in enterprise networks, SBCs are now typically focused on securing SIP (Session Initiation Protocol) infrastructures. As SIP has been evolving over the decades, SBCs enable interworking between disparate protocol versions and optional headers.

SUMMARY

The following presents a simplified summary of one or more aspects of the technology disclosed herein in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

In several examples, computer implemented methods, devices, and tangible non-transitory computer-readable media for forwarding session initiation messages are provided. In some examples, a second device (e.g., an SBC) receives, from a first device (e.g., a video teleconference server) of an IP communication network, an invitation (e.g., an SIP message) to create a session between the first device and a third device (e.g., a computer of a person participating in the teleconference) of the network. The invitation includes a session description, e.g., in SDP format. The second device determines whether to forward the invitation toward the third device based on a datastore comprising i) prior invitations received by the second device to create sessions between devices of the network, and ii) results of the prior invitations. Upon determining to forward the invitation, the second device forwards the invitation.

In some examples, determining includes using one or more of statistical modelling and machine learning based on the session description (other than on an identifier of the third device) to determine whether a likelihood of successfully creating the invited session meets a predefined threshold.

In some examples, the second device receives, from the third device, a message in response to the invitation. The message in response includes one of i) an acceptance of the invitation, and ii) a rejection of the invitation. In such examples, the second device updates the datastore with the response—thereby, in part, accreting information on the compatibility of devices like the third device to accept future invitations.

In some examples, the message in response is a rejection of the invitation. In such examples, the second device transmits, to the third device, a modified version of the received invitation based on the received message declining/rejecting. In some such examples, the session description of the received invitation includes a format specifier. In such examples, transmitting, by the second device to the third device, the modified version of the received invitation includes transmitting the received invitation without the format specifier. In some such examples, the format specifier indicates that a media stream of the session will include teletypewriter (TTY) tones.

In some examples, the message in response is a rejection of the invitation. In such examples, the second device transmits, to the first device, a rejection of the received invitation. In some examples, the message in response is a rejection of the invitation. In such examples, the second device re-transmits, to the third device, the received invitation after one of: a period of time since one of the rejection and the forwarding, and a predetermined number of messages to the third device since one of the rejection and the forwarding.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
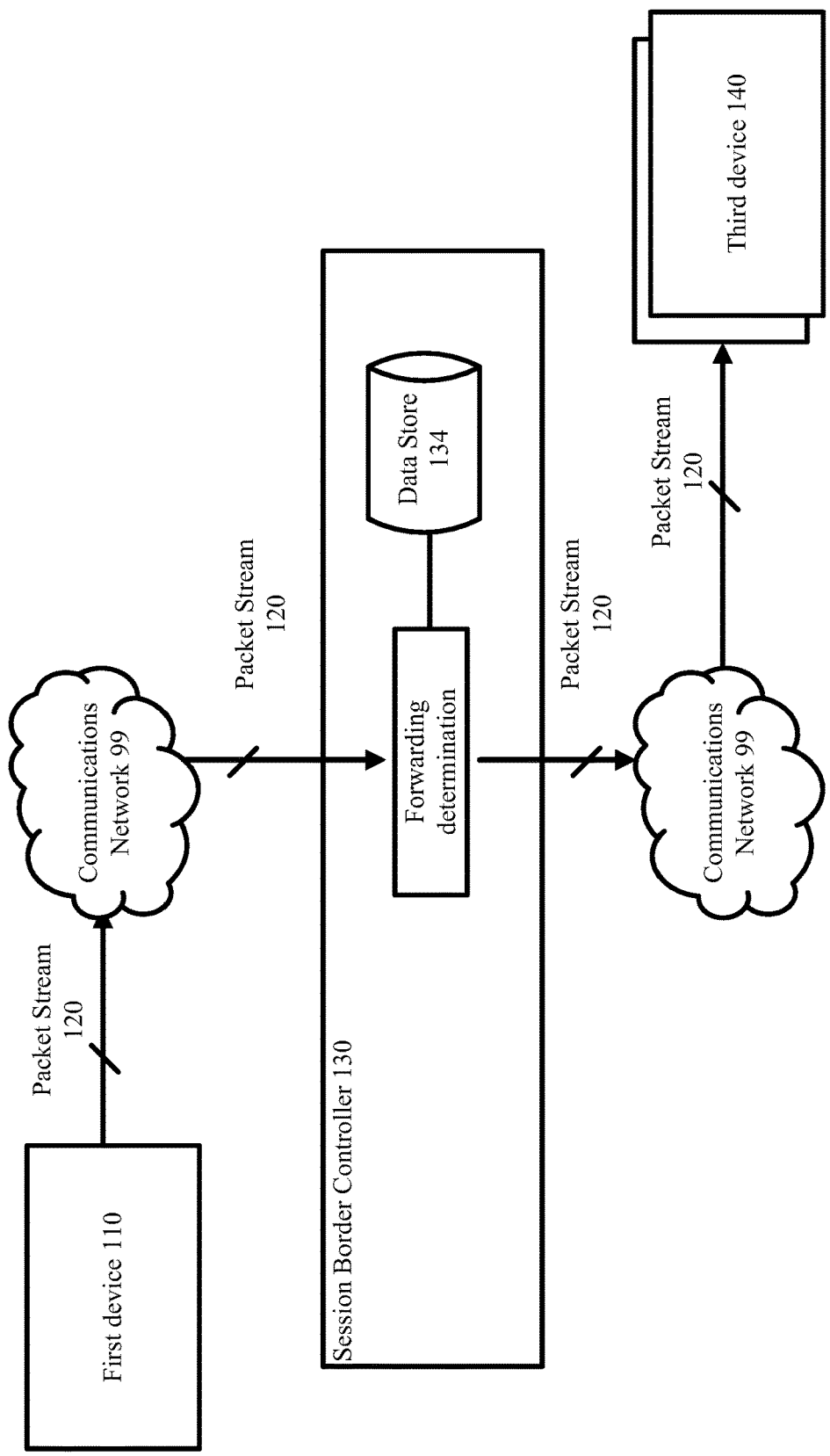
FIG. 1 is an illustration of examples of the present technology in a telecommunications context.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

An SBC can secure a core SIP network and application servers and provide client/server interworking by performing the role of a back-to-back user agent (B2BUA). It is by effectively terminating each session then re-establishing it, acting as both a user agent server (UAS) and user agent client (UAC) for every signaling message on each call leg, that an SBC can granularly control a communications session. SBCs can implement ingress Access Control Lists (ACLs) and rate limiting to prevent distributed denial of service (DDOS) attacks while parsing each message to eliminate malformed packet exploits.

By processing each SIP header and payload, such as the Session Description Protocol (SDP) portions, complex rules can be applied to alter message elements and enable interworking. SBCs can also be used to enable SIP traffic to traverse devices performing IPv4 Network Address Translation (NAT). Along with processing signaling messages, SBCs also handle media traffic, typically in the form of RTP. This enables an SBC not only to secure the media flows but also apply transcoding where clients and servers are unable to negotiate common codec capabilities. The SBC is also the point where lawful intercept is performed.

In modern SBC implementations, the signaling and media components can be decoupled and operate as individual network elements. This enables each function to be located in its most ideal logical or physical network layer (access/edge for media and core for signaling), while allowing each function to scale-out independently.

In VoIP, when a session/call is being set up, the endpoints signal to each other what codecs each endpoint supports, and hence what media the other end or an intermediate node (SBC for example) should expect. This information can be sent, e.g., as an invitation in Session Description Protocol (SDP) format through a SIP message. Which codecs an endpoint will use are signaled through a media description "m=*" line and described via one or more media attribute lines "a=*".

A teletypewriter (TTY) is a teleprinter, an electronic device for text communication over a telephone line, which is designed for use by persons with hearing or speech difficulties. TTYs were developed for use on the partially analog Public Switched Telephone Network (PSTN) and as such use tones to signal different letters that are sent as media over the telephone network. A second TTY device on the other end can convert these tones into letters to print to screen. Conventional TTY devices are not necessarily compatible with other devices in VoIP networks.

It would be desirable to signal if an endpoint is going to be sending TTY tones via the SDP or SIP Headers. Not signaling an intended use of TTY can result in various problems. For example, a standard voice phone receives a TTY call, so the called user hears only unintelligible tones. A TTY device receives a standard voice call, so the called user does not receive any text on screen. In both these circumstances it would be better if the phone did not ring, rather than trouble the user and use network resources. As another example, a network operator may not engage in interworking from TTY to a more modern protocol when this would be useful to the end user. As yet another example, network operator may wrongly engage in interworking from TTY to a more modern protocol when no TTY is in use. Finally, a network operator may expend resources attempting to detect whether TTY tones are in use on the stream, in order to determine whether TTY interworking is desirable on the call.

In some examples of the technology disclosed herein, a new "format specific parameter" is used in an "a=*" attribute line to signal that TTY tones are in use in the flow, and to take appropriate action (e.g., enable detection or interworking features, reject the call, proceed as normal, etc.) in light of the TTY state. Such an approach can reduce the need to use tone detection and allow rejection of certain calls earlier than other methods, saving on time and resources such as bandwidth.

In some examples of the technology disclosed herein, a device (such as an SBC) intermediate to the endpoints can make decisions on how to handle a given call based on the "a=*" parameter it receives. For example, an SBC can reject (without forwarding) a session invitation (intended for a third device) that indicates that TTY will be included in a stream from a first device because the SBC determines that it is likely (to a predetermined extent) that the third device cannot accept TTY data.

In some examples of the technology disclosed herein, such a determination can be made based on querying the third device or based on an accreted history of the SBC's interaction with such third devices (without using a predetermined profile of the third device)—not only with regard to a TTY parameter, but generally with respect to all SIP SDP features.

However, querying the third device costs time, bandwidth, processing resources. Having the initial offer rejected results in additional flows/messages being sent/processed. Querying the third device may also involve reserving media resource when processing initial invitation. In some examples of the technology disclosed herein, the SBC can determine whether to forward a session invitation without querying the third device, and without resort to an explicit profile of the third device, though use of an accreted history of the SBC's interaction with devices similar to the third device, e.g., devices behind the same firewall, devices with a similar/identical user-agent. In some such examples, the SBC can use statistical modelling and/or machine learning to determine whether to send the invitation based on various scopes e.g., IP/IP range/adjacency/service interface in conjunction with weighting as to whether it makes sense to forward the invitation or not.

In summary, the technology disclosed herein includes methods, systems, non-transitory computer program products, and apparatuses for telecommunication in which a second device (e.g., an SBC) receives, from a first device (e.g., a video teleconference server) of an IP communication network, an invitation (e.g., an SIP message) to create a session between the first device and a third device (e.g., a computer of a person participating in the teleconference) of the network. The invitation includes a session description, e.g., in SDP format. The second device determines whether to forward the invitation toward the third device based on a datastore comprising i) prior invitations received by the second device to create sessions between devices of the network, and ii) results of the prior invitations. Upon determining to forward the invitation, the second device forwards the invitation.

In some examples, determining includes using one or more of statistical modelling and machine learning based on the session description (other than on an identifier of the third device) to determine whether a likelihood of successfully creating the invited session meets a predefined threshold.

In some examples, the second device receives, from the third device, a message in response to the invitation. The message in response includes one of i) an acceptance of the invitation, and ii) a rejection of the invitation. In such examples, the second device updates the datastore with the response—thereby, in part, accreting information on the compatibility of devices like the third device to accept future invitations.

In some examples, the message in response is a rejection of the invitation. In such examples, the second device transmits, to the third device, a modified version of the received invitation based on the received message declining/rejecting. In some such examples, the session description of the received invitation includes a format specifier. In such examples, transmitting, by the second device to the third device, the modified version of the received invitation includes transmitting the received invitation without the format specifier. In some such examples, the format specifier indicates that a media stream of the session will include teletypewriter (TTY) tones.

In some examples, the message in response is a rejection of the invitation. In such examples, the second device transmits, to the first device, a rejection of the received invitation. In some examples, the message in response is a rejection of the invitation. In such examples, the second device re-transmits, to the third device, the received invitation after one of: a period of time since one of the rejection and the forwarding, and a predetermined number of messages to the third device since one of the rejection and the forwarding.

In some examples, the invitation is a Session Initiation Protocol (SIP) message; the session description is in Session Description Protocol (SDP) format; and the second device is a Session Border Controller.

Turning now to the figures, examples are depicted with reference to one or more components and one or more methods that may perform the actions or operations described herein. Although the operations described below in are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

Referring to FIG. 1, an example of the technology disclosed herein in the context of a notional architecture 100 is illustrated. Examples of the technology disclosed herein address the above challenges in part by determining, by an SBC 230, whether to forward an session invitation (e.g., in an SIP message containing SDP in packet stream 120 for TTY communication) received over a communication network 99 from a first device 110 (e.g., a TTY device, a teleconference server) toward one or more third devices 140 (e.g. a smartphone acting as a TTY device, a laptop computer of a teleconference invitee) based on a datastore 134 of prior invitations received by the SBC 230 to create sessions between devices of the network and results of the prior invitations.

As noted above, an SBC 230 is a network device deployed to protect SIP-based voice over VoIP networks. While some SBCs are deployed at borders between two service provider networks, such devices (and related devices) can be deployed between a service provider's access network and a backbone network to provide service to residential and/or enterprise customers. A "session" can be a call between two or more parties. Each call includes one or more signaling message exchanges that control the call, and one or more call media streams that carry the call's audio, video, or other data along with information of call statistics and quality. Together, these packet streams, e.g., a packet stream 120, make up a session. Some SBCs, or SBC-like devices, handle thousands (or even tens of thousands) of calls/packet streams concurrently.

Figure 2:
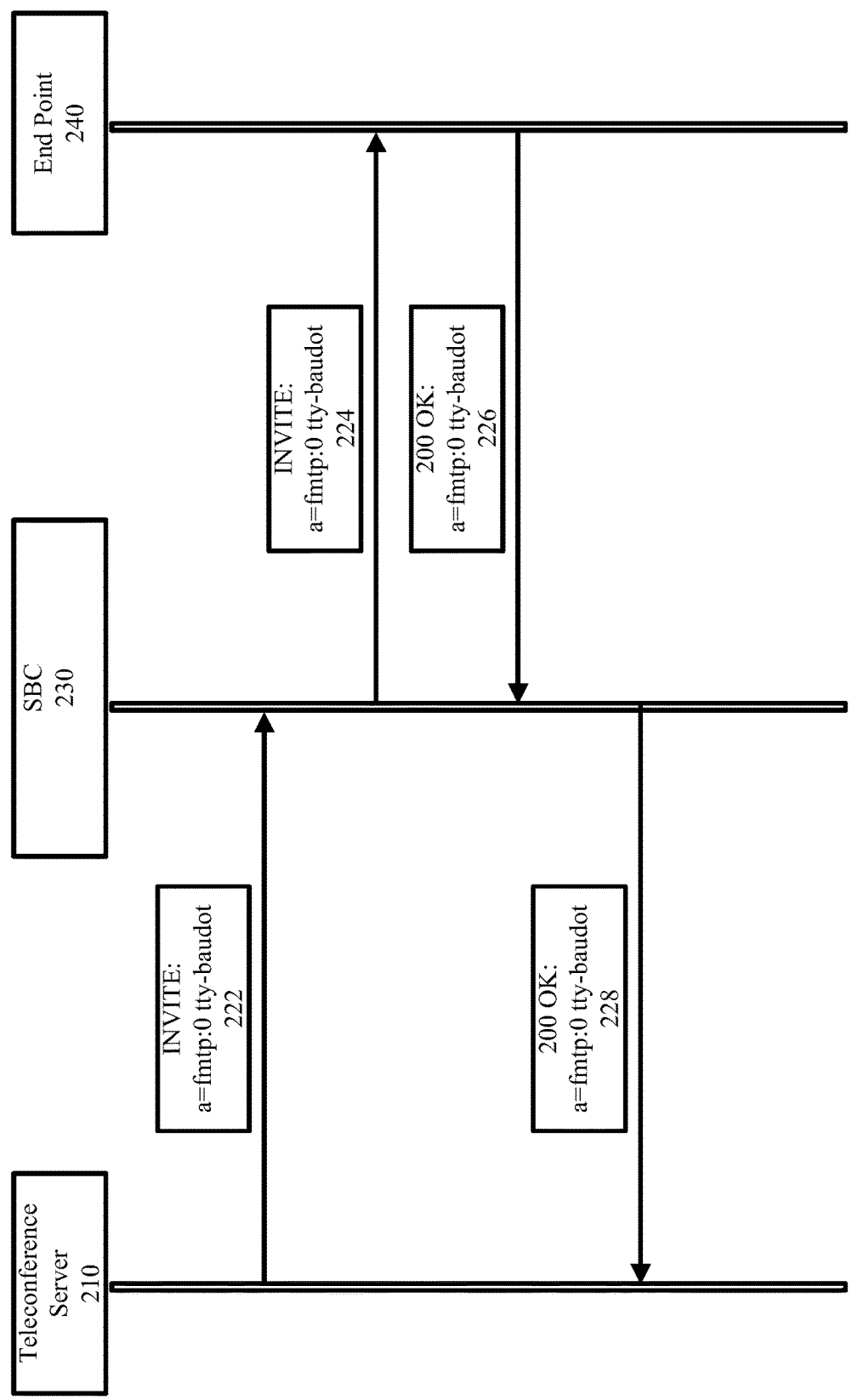
FIG. 2 illustrates an example message flow, in accordance with the technology disclosed herein.

Referring to FIG. 2 and continuing to refer to prior figures for context, an example message flow 200 is illustrated, in accordance with the technology disclosed herein. In the message flow 200, teleconference server 210 is the first device 110. Teleconference server 210 sends an SIP message 222 to SBC 230 (e.g., the second device 130). The message 222 is an invitation to initiate a session between teleconference server 210 and end point 240 (e.g., the third device 140). An example set of message 222 attributes is shown in TABLE 1.

TABLE 1 v=0
o=2223330003 69099683 69099763 IN IP4 68.117.255.163
s=X-PRO Lucent
c=IN IP4 10.220.20.28
t=0 0
m=audio 51866 RTP/AVP 0 18 101
a=rtpmap:0 PCMU/8000
a=rtpmap:18 G729/8000
a=rtpmap:101 telephone-event/8000
a=fmtp:101 0-15
a=fmtp:0 tty-baudot
a=sendrecv The message 222 contains an SDP-formatted media attribute line "a=fmtp:0 tty-baudot," indicating that the teleconference server 210 expects the media stream to include TTY tones using Baudot code encoding. In the example of FIG. 2, the teleconference server 210 passes "a-fmtp tty-baudot" in the payload it applies to (in example, payload 0 PCMU). The SBC 230 can check the fmtp information that applies to the given codec. The TTY parameter is used to signal what type of media will be received. TTY formats other than Baudot can be used, e.g., tty-edt, tty-bell 103. The SBC 230 passes the message 224 to the end point 240 and receives an acknowledgement 226 from end point 240 that the end point 240 can accommodate the specified TTY format. The SBC 230 then pass the acknowledgement as message 228 back to the teleconference server 210.

Figure 3:
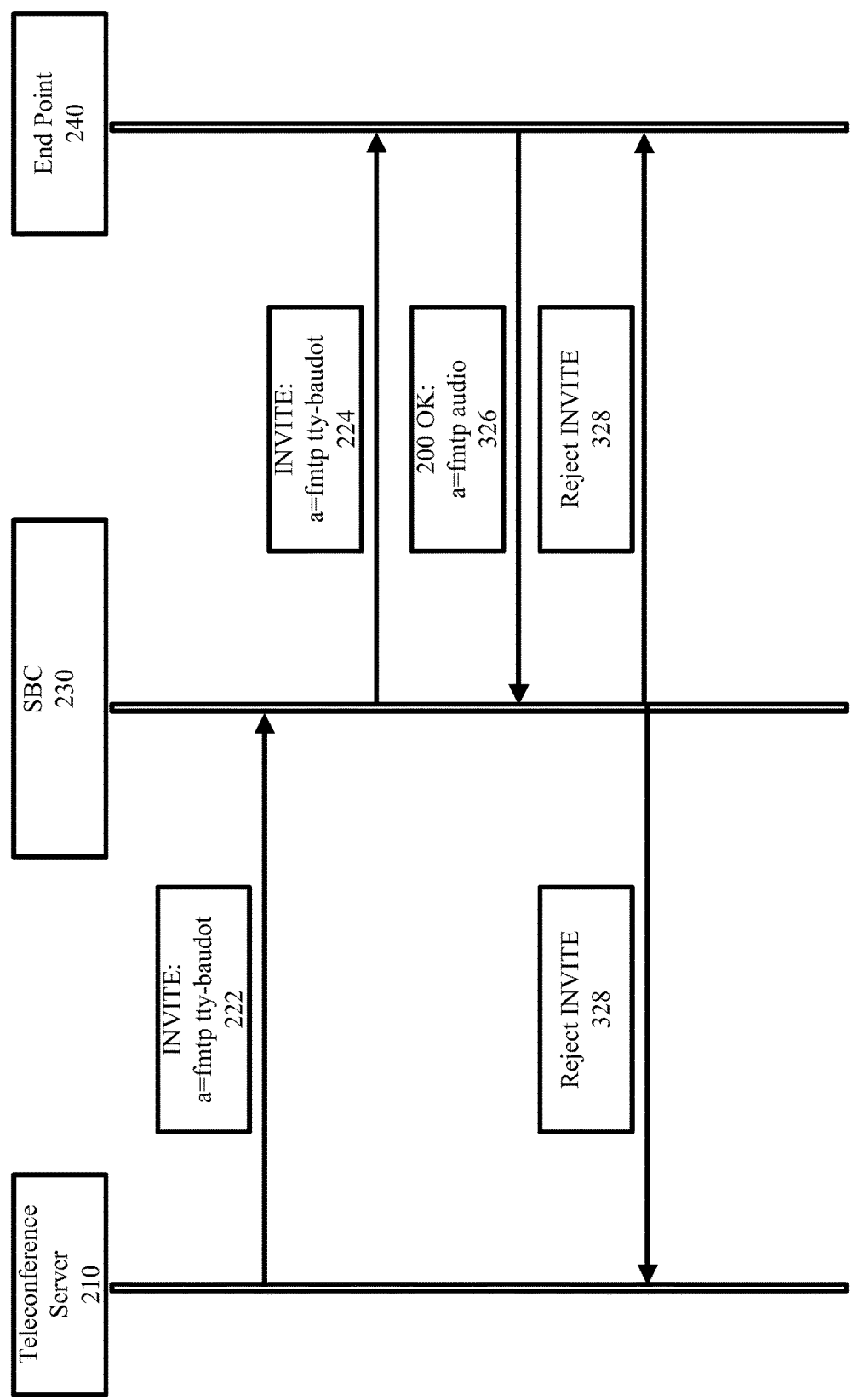
FIG. 3 illustrates an example message flow, in accordance with the technology disclosed herein.

Referring to FIG. 3 and continuing to refer to prior figures for context, another example message flow 300 is illustrated, in accordance with the technology disclosed herein. In message flow 300, as with FIG. 2, teleconference server 210 sends an SIP message 222 to SBC 230 (e.g., the second device 130). The message 222 is an invitation to initiate a session between teleconference server 210 and end point 240 (e.g., the third device 140). As described in connection with FIG. 2, the SBC 230 passes the message 222 to the end point 240 as message 224. But in FIG. 3, the SBC 230 receives an acknowledgement 326 from end point 240 that the end point 240 can accommodate audio and not the specified TTY format. In this case, the SBC 230 notifies, in message 328, each of the teleconference server 210 and the end point 240 that the invitation has been rejected.

While using the SBC 230 to reject sessions that cannot be properly established provides some benefit, having the initial offer rejected results in additional flows/messages being sent/processed. Such an approach may also be reserving media resources when processing the initial INVITE. It would be better if the SBC 230, at least in some portion of session initiations, correctly determined whether a session would be successfully established. For example, storing the result (whether a given call supported a certain parameter) can provide a basis for the SBC 230 to decide whether to forward a later INVITE. In some cases, statistical modelling and/or machine learning can be used to determine whether or not to forward an invitation at various scopes (e.g., IP, IP range, adjacency, service interface), in some cases in conjunction with weighting as to whether it makes sense to send the invitation or not. In particular, a datastore of such accreted history can be used without tracking profiles of individual devices.

Figure 4:
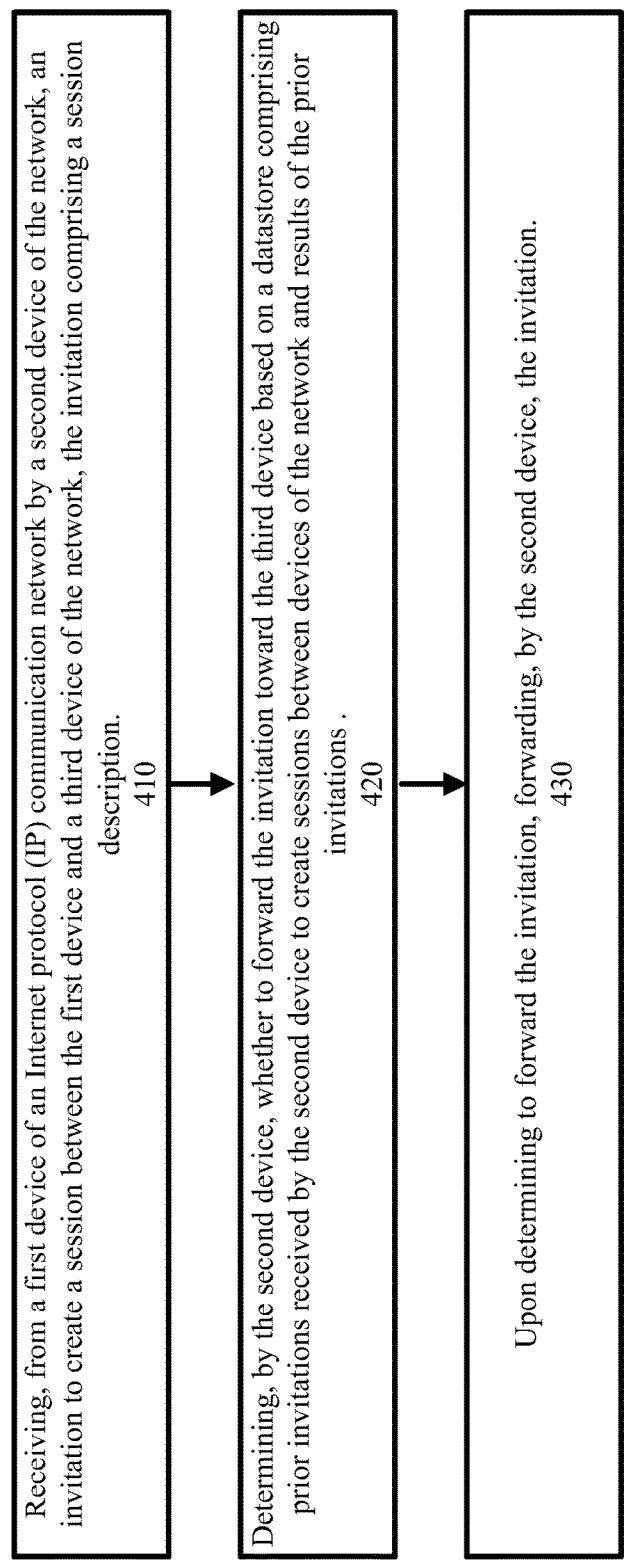
FIG. 4 illustrates example methods for forwarding session initiation messages are illustrated, in accordance with the technology disclosed herein.

Referring to FIG. 4, and continuing to refer to prior figures for context, example methods 400 for forwarding session initiation messages are illustrated, in accordance with the technology disclosed herein. In such methods, a second device of an IP communication network receives, from a first device of the network, an invitation to create a session between the first device and a third device of the network—Block 410. The invitation includes a session description.

Figure 5:
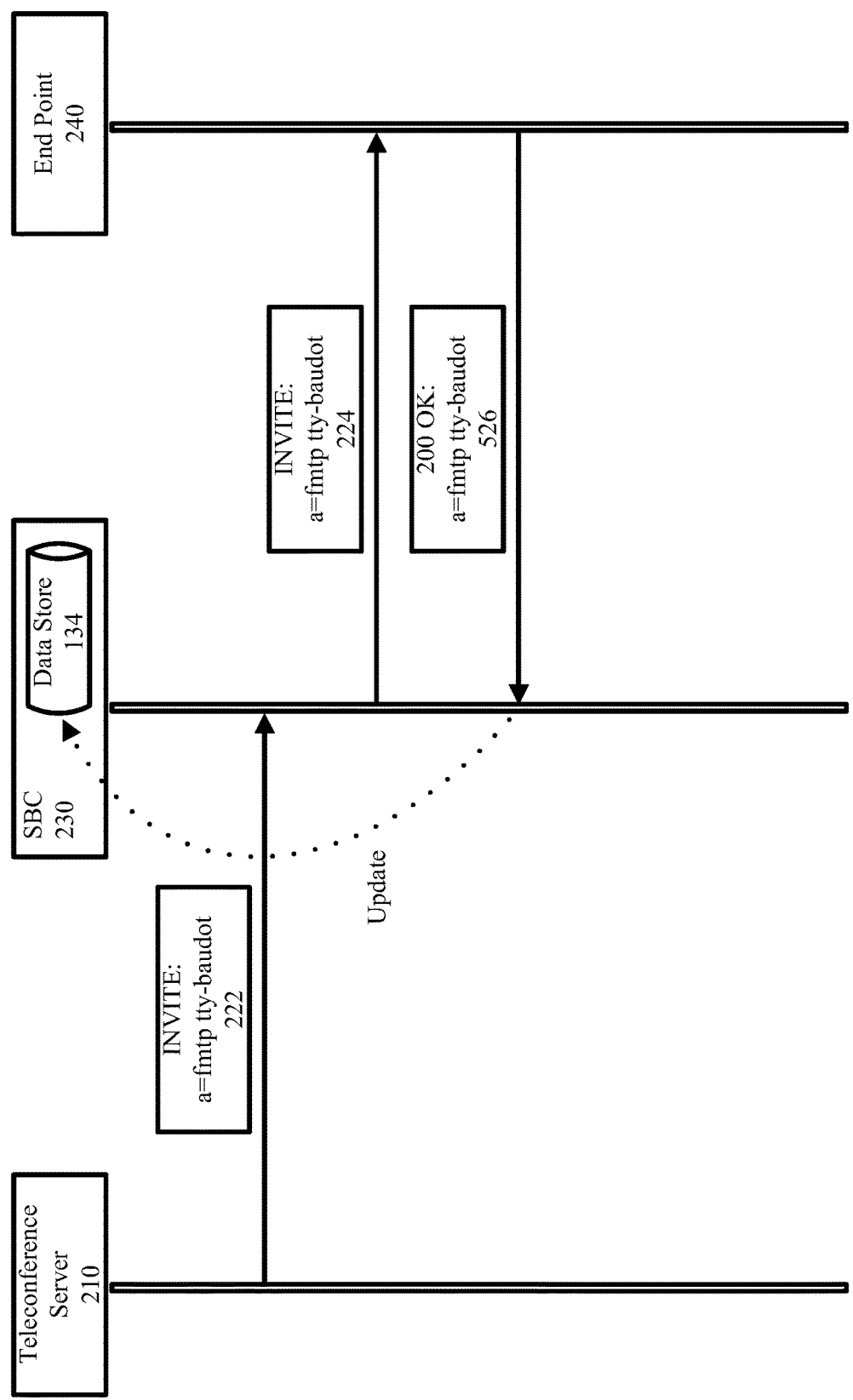
FIG. 5 illustrates an example message flow, in accordance with the technology disclosed herein.

Referring to FIG. 5, and continuing to refer to prior figures for context, an example message flow 500 is illustrated, in accordance with the technology disclosed herein. In the message flow 500, teleconference server 210 is the first device. Teleconference server 210 sends an SIP message 222 to SBC 230 (e.g., the second device 130). The message 222 is an invitation to initiate a session between teleconference server 210 and end point 240 (e.g., the third device 140). The message 222 contains an SDP formatted media attribute line "a=fmtp tty-baudot," indicating that the teleconference server 210 expects the media stream to include TTY tones using Baudot code encoding. Note that in some cases, the second device 130 can be other than an SBC 230.

The second device determines whether to forward the invitation toward the third device based on a datastore comprising prior invitations received by the second device to create sessions between devices of the network and results of the prior invitations—Block 420.

In the example message flow 500, SBC 230 uses datastore 134 to check prior invitations and the results of those invitations. In an example, SBC 230 knows, from the SDP header of message 222, that the "User-Agent" is "X-PRO Lucent release 11041." The SBC 230 uses a statistical model to determine that there is greater than a threshold likelihood that a X-PRO Lucent release 11041 user agent will accept a media stream with the attribute "a=fmtp tty-baudot." In other examples, a machine learning model can be used in the same way as the statistical model. Note that in this example, the SBC 230 is not merely profiling the end point 240—but is coming to a determination based on results, collected by the SBC 230 over time, from devices similar (or similarly situated) to the end point 240. The similarity may not only be in direct attributes of the end point 240, but in aspects such as the path from the SBC 230 to the end point 240 accreted by the SBC 230 over time. The attributes considered in the forwarding determination do not have to be tied to the user agent header.

Upon determining to forward the invitation, the second device forwards the invitation—Block 430. In the example message flow 500, 95% of interactions that the SBC 230 recorded in datastore 134 when initiating a session with an X-PRO Lucent release 11041 user agent were successful. The statistical model weighs this success as a prominent factor in determining that the present invitation will be successful, and the SBC 230 forwards the received invitation to the end point 240.

Figure 6:
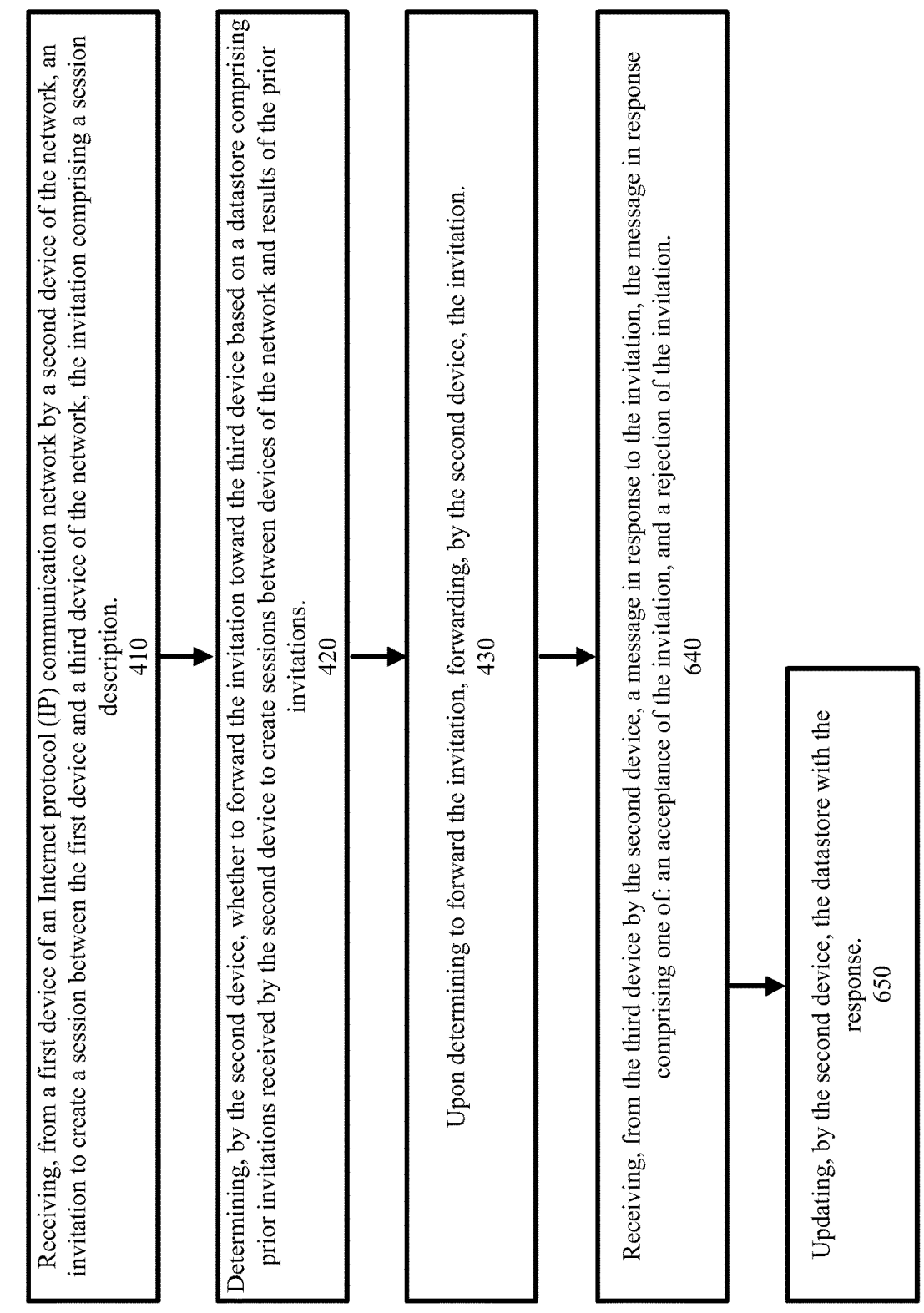
FIG. 6, illustrates example methods for forwarding session initiation messages are illustrated, in accordance with the technology disclosed herein.

Referring to FIG. 6, and continuing to refer to prior figures for context, example methods 600 for forwarding session initiation messages are illustrated, in accordance with the technology disclosed herein. In such methods 600, Block 410, Block 420, and Block 430 are performed as described above. Such methods 600 further include the second device receiving, from the third device, a message in response to the invitation, the message including one of: an acceptance of the invitation, and a rejection of the invitation—Block 640. In the example message flow 500, the SBC 230 receives an acknowledgement 526 from end point 240 that the end point 240 can accommodate the specified TTY format.

The second device updates the datastore with the received response—Block 650. In the example message flow 500, the SBC 230 updates datastore 134 to include that an end point 240 described by certain characteristics (e.g., SDP described by "User-Agent=X-PRO Lucent release 11041," a certain contact field, etc.) accepted a SIP invitation to establish a session that includes TTY tones.

Figure 7:
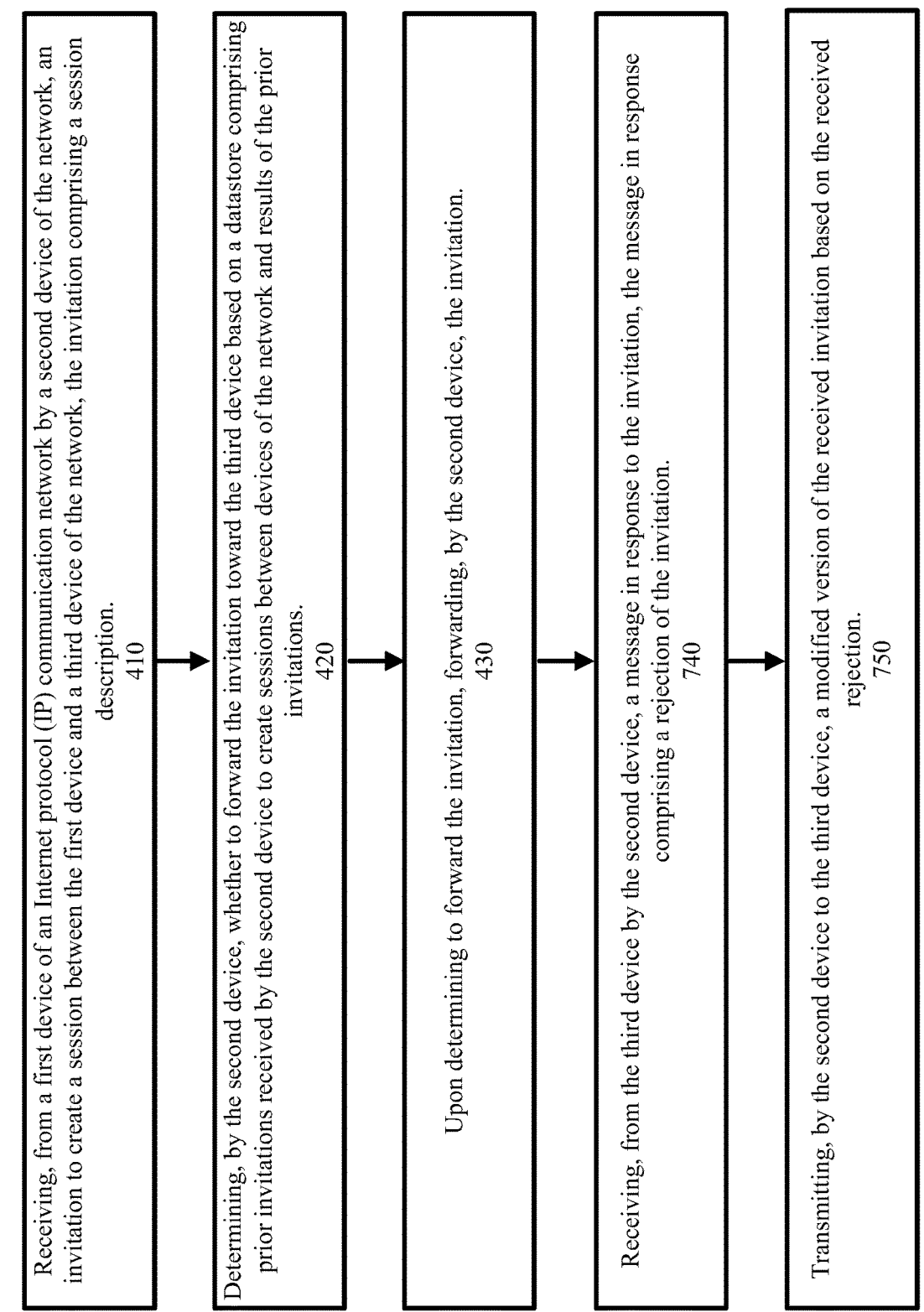
FIG. 7 illustrates example methods for forwarding session initiation messages are illustrated, in accordance with the technology disclosed herein.

Referring to FIG. 7, and continuing to refer to prior figures for context, example methods 700 for forwarding session initiation messages are illustrated, in accordance with the technology disclosed herein. In such methods 600, Block 410, Block 420, and Block 430 are performed as described above. Such methods 700 further include receiving, from the third device by the second device, a message in response to the invitation, the message in response comprising a rejection of the invitation—Block 740.

Figure 8:
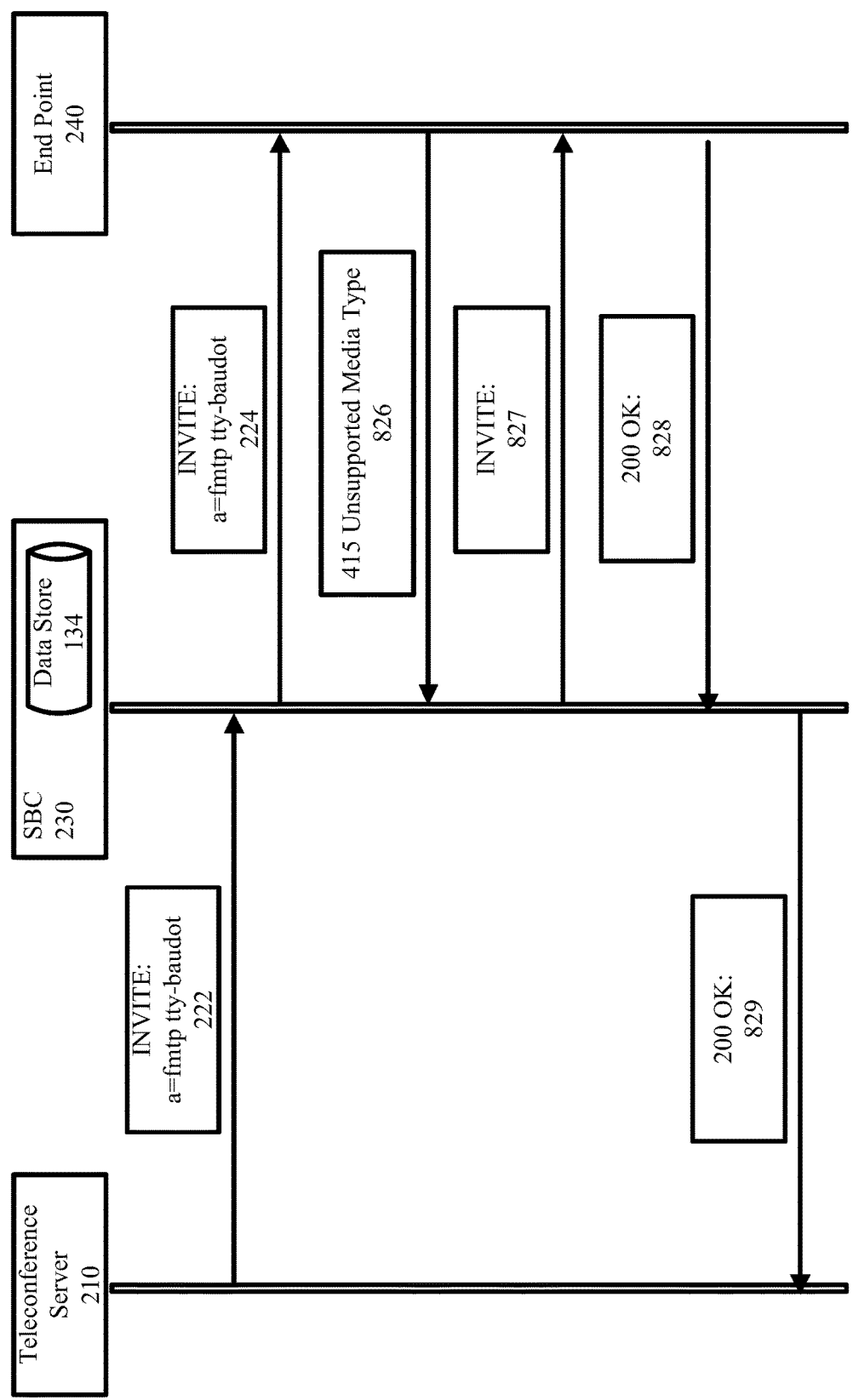
FIG. 8 illustrates an example message flow, in accordance with the technology disclosed herein.

Referring to FIG. 8, and continuing to refer to prior figures for context, an example message flow 800 is illustrated, in accordance with methods 700. In the message flow 800, teleconference server 210 is the first device 110. Teleconference server 210 sends an SIP message 222 to SBC 230 (e.g., the second device 130). The message 222 is an invitation to initiate a session between teleconference server 210 and end point 240 (e.g., the third device 140). An example set of message attributes is shown in TABLE 1—with the message 222 including "a=fmtp tty-baudot" indicating that the proposed session will include TTY tones. In the example message flow 800, the SBC 230 receives an acknowledgement 826 from end point 240 that the end point 240 cannot support the specified TTY format as a media type.

The second device transmits, to the third device, a modified version of the received invitation based on the rejection—Block 750. In the example message flow 800 of FIG. 8, the SBC 230 transmits an SIP INVITE 827 without the "a=fmtp tty-baudot" indicating that the proposed session will include TTY tones. The choice of which one or more SDP parameters to omit from the modified version can be based on one or more of feedback in the message rejecting the initial invitation (e.g., message 826 explicitly rejected the media type, or the SBC 230 can infer the reason for a rejection), machine learning applied at the SBC 230, and a prioritized list of invitation features to modify.

Figure 9:
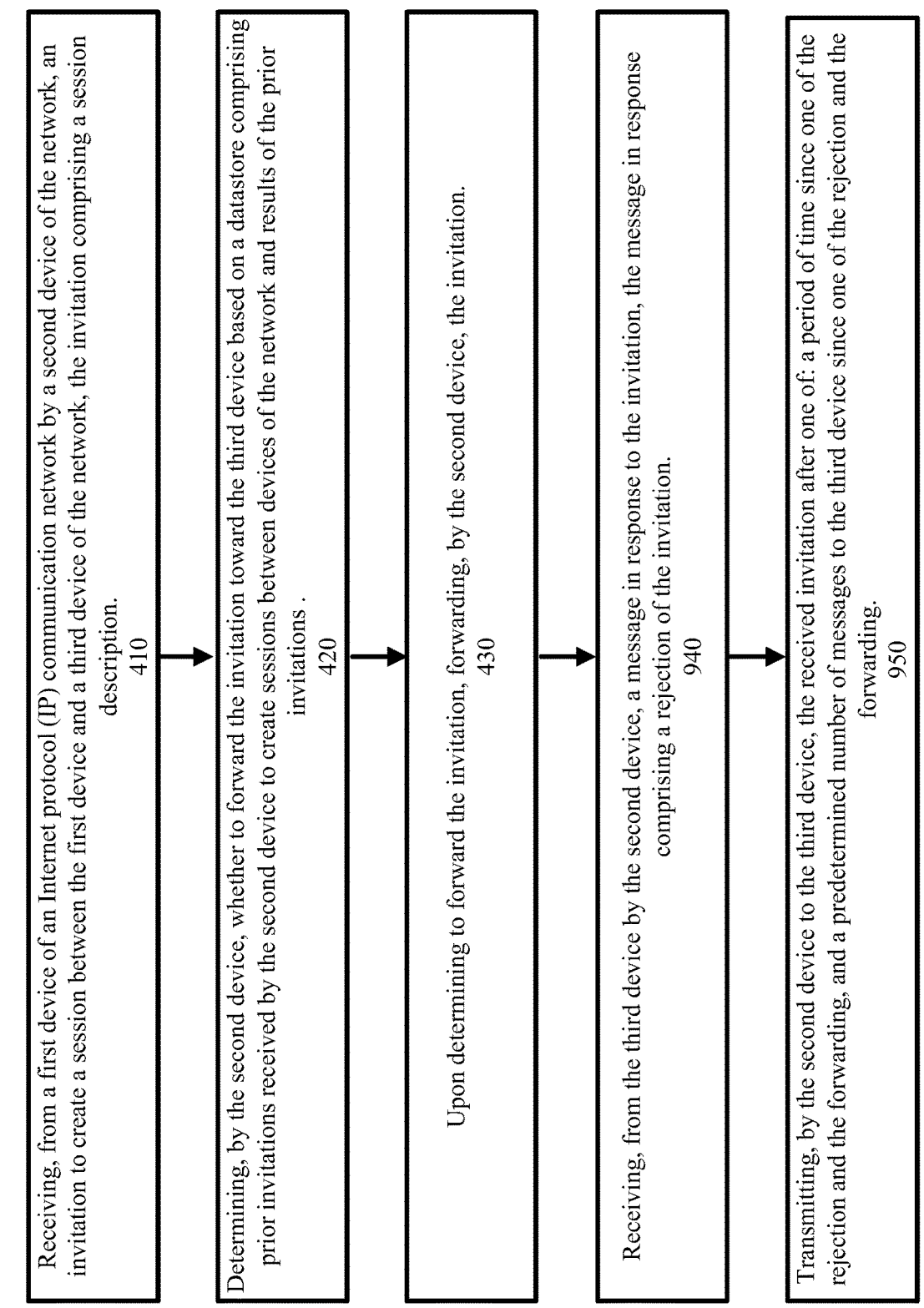
FIG. 9 illustrates example methods for forwarding session initiation messages are illustrated, in accordance with the technology disclosed herein.

Referring to FIG. 9, and continuing to refer to prior figures for context, example methods 900 for forwarding session initiation messages are illustrated, in accordance with the technology disclosed herein. In such methods 900, Block 410, Block 420, and Block 430 are performed as described above. Such methods 900 further include receiving, from the third device by the second device, a message in response to the invitation, the message in response comprising a rejection of the invitation—Block 940.

Figure 10:
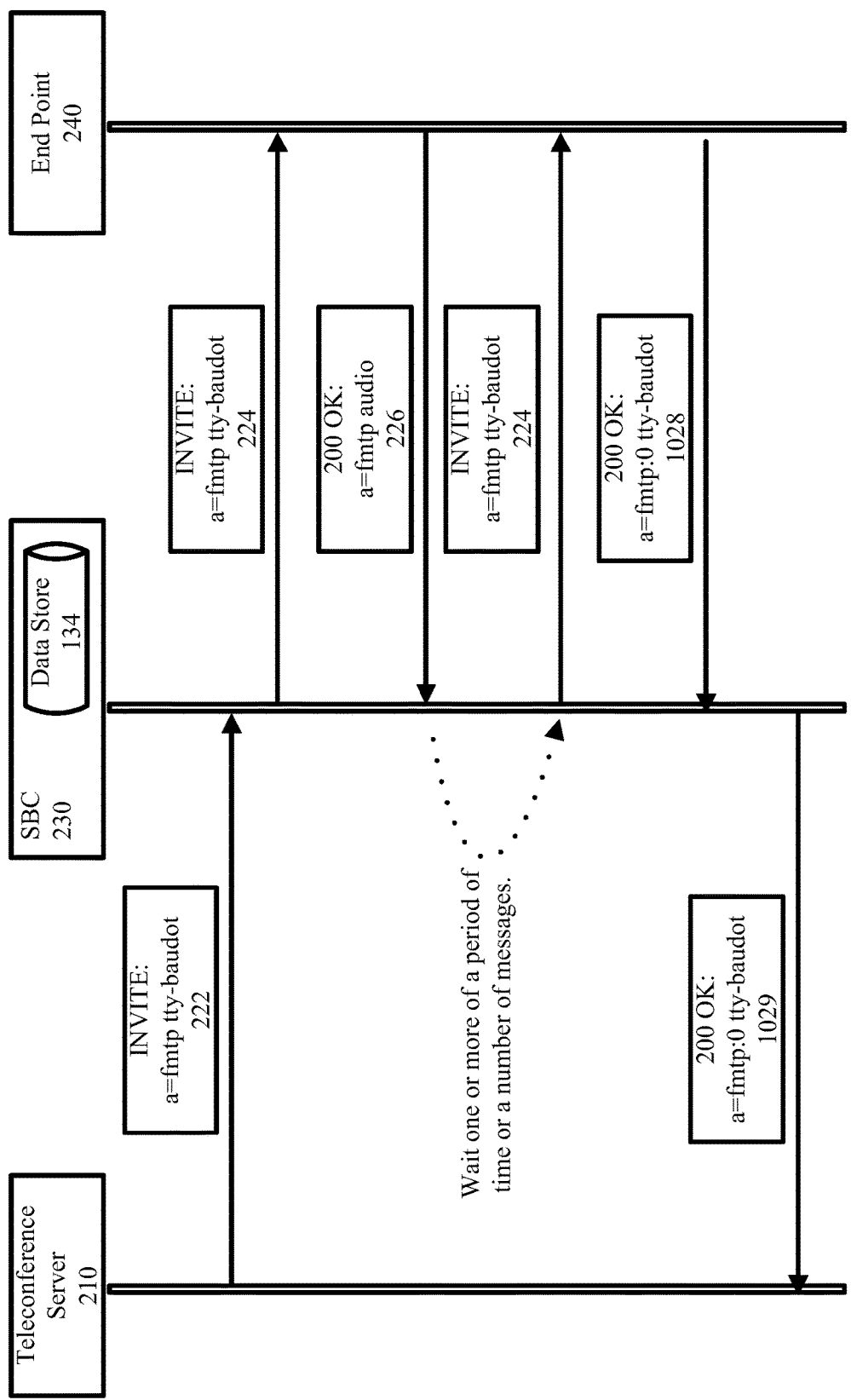
FIG. 10 illustrates an example message flow, in accordance with the technology disclosed herein.

Referring to FIG. 10 and continuing to refer to prior figures for context, an example message flow 1000 is illustrated, in accordance with methods 900. In message flow 1000 the SBC 230 receives an acknowledgement 226 from end point 240 that the end point 240 can accommodate audio and cannot accommodate the specified TTY format.

The second device transmits, to the third device, the received invitation after one of: a period of time since one of the rejection and the forwarding, and a predetermined number of messages to the third device since one of the rejection and the forwarding—Block 950.

In message flow 1000, the SBC 230 retransmits the original INVITE message 224 to the end point 240 after waiting for a period of time. On this retransmission, the SBC 230 receives a response message 1028 accepting the INVITE and then relays the response 1028 to the teleconference server 210 as message 1029.

In some examples of the technology disclosed herein, if a parameter in an invitation was mandatory and the SBC 230 knows the end point 240 (or any node downstream from the SBC 230, or any other intermediate network device, to the end point 240) does not support the mandatory parameter, the SBC 230 we can reject on behalf of the end point 240. This approach is useful in the cloud operated world where there is little to no control over what end points plug into the network, and the SBC 230 has little or no information on what capabilities end points or intermediate points may have. Another advantage of the technology disclosed herein is the saving on network resources, since the technology can rejecting calls earlier on the process than otherwise and not send likely superfluous messages across the network. The technology disclosed herein can use accreted information to build up knowledge on what types of user agents support. Using statistical analysis combined with machine learning/AI examples of the technology disclosed herein can use an algorithm that can decide based on what other similar user agents support, whether to send certain capabilities and parameters on calls. Such an approach is useful for reducing resource costs if the network avoids some calls and messages would get rejected. Some examples of the technology disclosed herein use a "revision rate," e.g., after X messages, the technology attempts a SIP/SDP parameter that was previously rejected to see if it is now supported.

Figure 11:
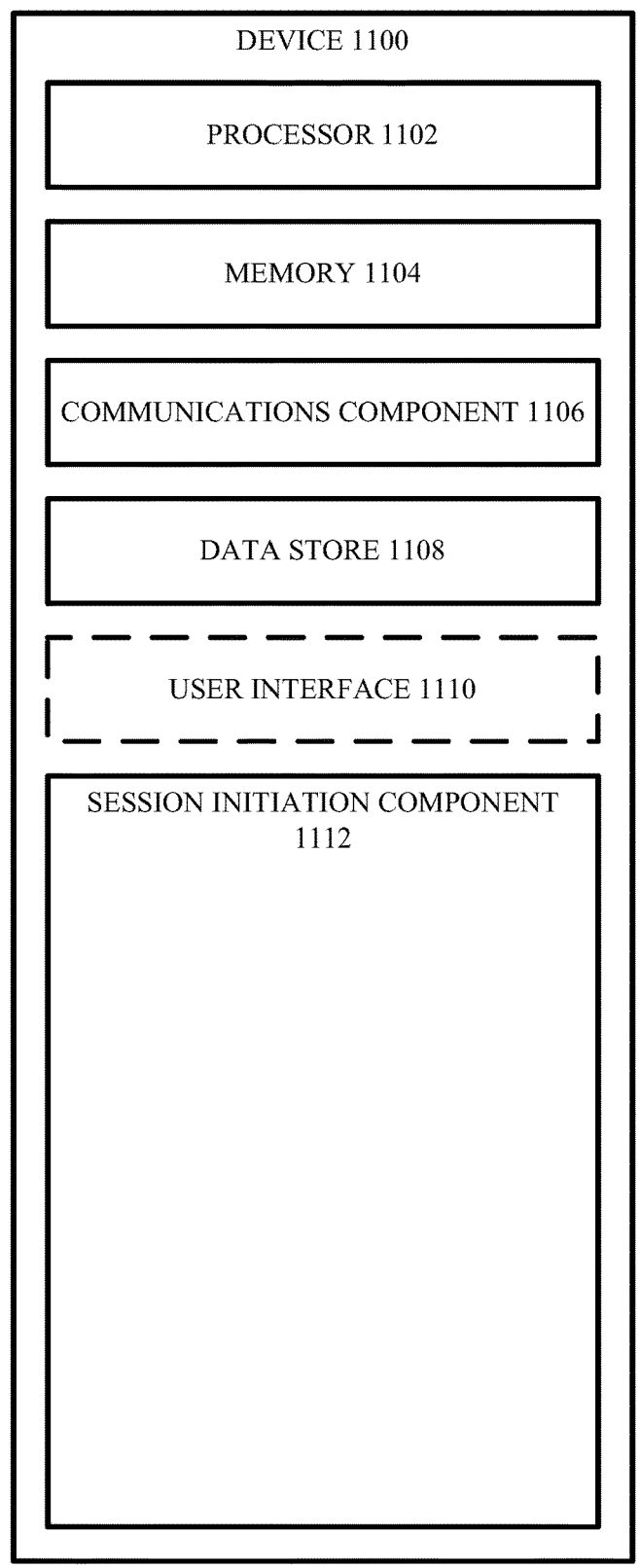
FIG. 11 is a schematic diagram of an example of a device for performing functions described herein.

Referring to FIG. 11, and continuing to refer to prior figures, in some examples, the method is deployed in a physical or virtual device such as device 1100. Device 1100 may further include memory 1104, such as for storing local versions of operating systems (or components thereof) and/or applications being executed by processor 1102, such as a streaming application/service, etc., related instructions, parameters, etc. Memory 1104 can include a type of memory usable by a computer, such as random access memory (RAM), read only memory (ROM), tapes, magnetic discs, optical discs, volatile memory, non-volatile memory, and any combination thereof.

Further, device 1100 may include a communications component 1106 that provides for establishing and maintaining communications with one or more other devices, parties, entities, etc. utilizing hardware, software, and services as described herein. Communications component 1106 may carry communications between components on device 1100, as well as between device 1100 and external devices, such as devices located across a communications network and/or devices serially or locally connected to device 1100. For example, communications component 1106 may include one or more buses, and may further include transmit chain components and receive chain components associated with a wireless or wired transmitter and receiver, respectively, operable for interfacing with external devices.

Additionally, device 1100 may include a data store 1108, which can be any suitable combination of hardware and/or software that provides for mass storage of information, databases, and programs employed in connection with aspects described herein. For example, data store 1108 may be or may include a data repository for operating systems (or components thereof), applications, related parameters, etc.) not currently being executed by processor 1102. In addition, data store 1108 may be a data repository for session initiation component 1112 (discussed below) and/or one or more other components of the device 1100.

Device 1100 may optionally include a user interface component 1110 operable to receive inputs from a user of device 1100 and further operable to generate outputs for presentation to the user. User interface component 1110 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 1110 may include one or more output devices, including but not limited to a display, a speaker, a haptic feedback mechanism, a printer, any other mechanism capable of presenting an output to a user, or any combination thereof. For example, user interface component 1110 may render streaming content for consumption by a user (e.g., on a display of the device 1100, an audio output of the device 1100, and/or the like).

In some examples, the technology described herein is deployed in a physical or virtual device such as device 1100, and session initiation component 1112 of device 1100 provides means for the device 1100 (e.g., second device 130) of an IP communication network to receive, from a first device 110 of the network, an invitation to create a session between the first device 110 and a third device 140 of the network. In such examples, session initiation component 1112 of device 1100 provides means for the device 1100 to determine whether to forward the invitation toward the third device 140 based on a datastore 134 comprising prior invitations received by the device 1100 to create sessions between devices of the network and results of the prior invitations. In such examples, session initiation component 1112 of device 1100 provides means for device 1100 to, upon determining to forward the invitation, forward the invitation.

In some examples, session initiation component 1112 of device 1100 provides means for the device 1100 to perform the determining by determining, using statistical modelling based on the session description other than on an identifier of the third device 140, whether a likelihood of successfully creating the invited session meets a predefined threshold. In some examples, session initiation component 1112 of device 1100 provides means for the device 1100 to perform the determining by determining, using a machine learning model based on the session description other than on an identifier of the third device 140, whether to forward the received invitation.

In some examples, session initiation component 1112 of device 1100 provides means for the device 1100 to [1] receive, from the third device 140, a message in response to the invitation, the message in response comprising one of an acceptance of the invitation, and a rejection of the invitation; and [2] update the datastore 134 with the response. In some examples, session initiation component 1112 of device 1100 provides means for the device 1100 to transmit, to the third device 140, a modified version of the received invitation based on the received message declining/rejecting, wherein the message in response is a rejection of the invitation. In some examples, the session description of the received invitation includes a format specifier, and session initiation component 1112 of device 1100 provides means for the device 1100 to transmit, to the third device 140, the modified version of the received invitation comprises transmitting the received invitation without the format specifier. In some such examples, the format specifier indicates that a media stream of the session will include teletypewriter (TTY) tones.

In some examples, the message in response is a rejection of the invitation, and session initiation component 1112 of device 1100 provides means for the device 1100 to transmit, to the first device 110, a rejection of the received invitation. In some examples, the message in response is a rejection of the invitation, and session initiation component 1112 of device 1100 provides means for re-transmitting, by the second device to the third device, the received invitation after one of: a period of time since one of the rejection and the forwarding, and a predetermined number of messages to the third device since one of the rejection and the forwarding. In some examples, the invitation is a Session Initiation Protocol (SIP) message; the session description is in Session Description Protocol (SDP) format; and the second device is a Session Border Controller.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

As a first further example, a second device (e.g., an SBC) receives, from a first device (e.g., a video teleconference server) of an IP communication network, an invitation (e.g., an SIP message) to create a session between the first device and a third device (e.g., a computer of a person participating in the teleconference) of the network. The invitation includes a session description, e.g., in SDP format. The second device determines whether to forward the invitation toward the third device based on a datastore comprising i) prior invitations received by the second device to create sessions between devices of the network, and ii) results of the prior invitations. Upon determining to forward the invitation, the second device forwards the invitation.

A second further example includes the first further example, in which determining includes using one or more of statistical modelling and machine learning based on the session description (other than on an identifier of the third device) to determine whether a likelihood of successfully creating the invited session meets a predefined threshold.

A third further example includes the previous further example, in which the second device receives, from the third device, a message in response to the invitation. The message in response includes one of i) an acceptance of the invitation, and ii) a rejection of the invitation. In such examples, the second device updates the datastore with the response—thereby, in part, accreting information on the compatibility of devices like the third device to accept future invitations.

A third further example includes the previous further example, in which the message in response is a rejection of the invitation. In such examples, the second device transmits, to the third device, a modified version of the received invitation based on the received message declining/rejecting. In some such examples, the session description of the received invitation includes a format specifier. In such examples, transmitting, by the second device to the third device, the modified version of the received invitation includes transmitting the received invitation without the format specifier. In some such examples, the format specifier indicates that a media stream of the session will include teletypewriter (TTY) tones.

A third further example includes the previous further example, in which the message in response is a rejection of the invitation. In such examples, the second device transmits, to the first device, a rejection of the received invitation. In some examples, the message in response is a rejection of the invitation. In such examples, the second device re-transmits, to the third device, the received invitation after one of: a period of time since one of the rejection and the forwarding, and a predetermined number of messages to the third device since one of the rejection and the forwarding.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

We claim:

1. A computer-implemented method, comprising:
receiving, from a first device of an Internet protocol (IP) communication network by a second device of the network, an invitation to create a session between the first device and a third device of the network, the invitation comprising a session description;
determining, by the second device, whether to forward the invitation toward the third device based on a datastore comprising prior invitations received by the second device to create sessions between devices of the network and results of the prior invitations; and
upon determining to forward the invitation, forwarding, by the second device, the invitation.

2. The method of claim 1, wherein:
the determining comprises determining, using statistical modelling based on the session description other than on an identifier of the third device, whether a likelihood of successfully creating the invited session meets a predefined threshold.

3. The method of claim 1, wherein:
the determining comprises determining, using a machine learning model based on the session description other than on an identifier of the third device, whether to forward the received invitation.

4. The method of claim 1, further comprising:
receiving, from the third device by the second device, a message in response to the invitation, the message in response comprising one of:
an acceptance of the invitation, and
a rejection of the invitation; and
updating, by the second device, the datastore with the response.

5. The method of claim 4, wherein:
the message in response is a rejection of the invitation; and
the method further comprises transmitting, by the second device to the third device, a modified version of the received invitation based on the received message declining/rejecting.

6. The method of claim 5, wherein:
the session description of the received invitation includes a format specifier; and
transmitting, by the second device to the third device, the modified version of the received invitation comprises transmitting the received invitation without the format specifier.

7. The method of claim 6, wherein the format specifier indicates that a media stream of the session will include teletypewriter (TTY) tones.

8. The method of claim 4, wherein:
the message in response is a rejection of the invitation; and
the method further comprises transmitting, by the second device to the first device, a rejection of the received invitation.

9. The method of claim 4, wherein:
the message in response is a rejection of the invitation; and
the method further comprises re-transmitting, by the second device to the third device, the received invitation after one of:
a period of time since one of the rejection and the forwarding, and
a predetermined number of messages to the third device since one of the rejection and the forwarding.

10. The method of claim 1, wherein:
the invitation is a Session Initiation Protocol (SIP) message;
the session description is in Session Description Protocol (SDP) format; and
the second device is a Session Border Controller.

11. A network device, comprising:
a memory; and
at least one processor coupled to the memory, the memory including instructions executable by the at least one processor to cause the device to:
receive, from a first device of an Internet protocol (IP) communication network, an invitation to create a session between the first device and a third device of the network, the invitation comprising a session description;
determine whether to forward the invitation toward the third device based on a datastore comprising prior invitations received by the network device to create sessions between devices of the network and results of the prior invitations; and
upon determining to forward the invitation, forward the invitation toward the third device.

12. The network device of claim 11, wherein:
the determining comprises determining, using statistical modelling based on the session description other than on an identifier of the third device, whether a likelihood of successfully creating the invited session meets a predefined threshold.

13. The network device of claim 11, wherein:
the determining comprises determining, using a machine learning model based on the session description other than on an identifier of the third device, whether to forward the received invitation.

14. The network device of claim 11, wherein the memory further includes instructions executable by the at least one processor to cause the device to:
receive, from the third device, a message in response to the invitation, the message in response comprising one of:
an acceptance of the invitation, and
a rejection of the invitation; and
update the datastore with the response.

15. The network device of claim 14, wherein:
the message in response is a rejection of the invitation; and
the memory further includes instructions executable by the at least one processor to cause the device to transmit, to the third device, a modified version of the received invitation based on the received message declining/rejecting.

16. The network device of claim 15, wherein:
the session description of the received invitation includes a format specifier; and
transmitting, to the third device, the modified version of the received invitation comprises transmitting the received invitation without the format specifier.

17. The network device of claim 16, wherein the format specifier indicates that a media stream of the session will include teletypewriter (TTY) tones.

18. The network device of claim 14, wherein:
the message in response is a rejection of the invitation; and
the memory further includes instructions executable by the at least one processor to cause the device to transmit, to the first device, a rejection of the received invitation.

19. The network device of claim 14, wherein:
the message in response is a rejection of the invitation; and
the memory further includes instructions executable by the at least one processor to cause the device to re-transmit, to the third device, the received invitation after one of:
a period of time since one of the rejection and the forwarding, and
a predetermined number of messages to the third device since one of the rejection and the forwarding.

20. The network device of claim 11, wherein:
the invitation is a Session Initiation Protocol (SIP) message;
the session description is in Session Description Protocol (SDP) format; and
the network device is a Session Border Controller.

21. A non-transitory computer-readable medium storing instructions thereon that, when executed by at least one computing device, causes the at least one computing device to perform operations comprising:
receiving, from a first device of an Internet protocol (IP) communication network, an invitation to create a session between the first device and a third device of the network, the invitation comprising a session description;
determining whether to forward the invitation toward the third device based on a datastore comprising prior invitations received by the at least one computing device to create sessions between devices of the network and results of the prior invitations; and
upon determining to forward the invitation, forwarding the invitation.

22. The computer-readable medium of claim 21, wherein:
the determining comprises determining, using statistical modelling based on the session description other than on an identifier of the third device, whether a likelihood of successfully creating the invited session meets a predefined threshold.

23. The computer-readable medium of claim 21, wherein:
the determining comprises determining, using a machine learning model based on the session description other than on an identifier of the third device, whether to forward the received invitation.

24. The computer-readable medium of claim 21, wherein the instructions further comprise instructions that, when executed by the at least one computing device, causes the at least one computing device to perform operations comprising:
receiving, from the third device, a message in response to the invitation, the message in response comprising one of:
an acceptance of the invitation, and
a rejection of the invitation; and
updating the datastore with the response.

25. The computer-readable medium of claim 24, wherein:
the message in response is a rejection of the invitation; and
the instructions further comprise instructions that, when executed by the at least one computing device, causes the at least one computing device to perform operations comprising transmitting, to the third device, a modified version of the received invitation based on the received message declining/rejecting.

26. The computer-readable medium of claim 25, wherein:
the session description of the received invitation includes a format specifier; and
transmitting, to the third device, the modified version of the received invitation comprises transmitting the received invitation without the format specifier.

27. The computer-readable medium of claim 26, wherein the format specifier indicates that a media stream of the session will include teletypewriter (TTY) tones.

28. The computer-readable medium of claim 24, wherein:
the message in response is a rejection of the invitation; and
the instructions further comprise instructions that, when executed by the at least one computing device, causes the at least one computing device to perform operations comprising transmitting, to the first device, a rejection of the received invitation.

29. The computer-readable medium of claim 24, wherein:
the message in response is a rejection of the invitation; and
the instructions further comprise instructions that, when executed by the at least one computing device, causes the at least one computing device to perform operations comprising re-transmitting, to the third device, the received invitation after one of:
a period of time since one of the rejection and the forwarding, and
a predetermined number of messages to the third device since one of the rejection and the forwarding.

30. The computer-readable medium of claim 21, wherein:
the invitation is a Session Initiation Protocol (SIP) message;
the session description is in Session Description Protocol (SDP) format; and
the at least one computing device is a Session Border Controller.

* * * * *